March 24, 1942. R. C. TOWNSEND 2,277,615
METHOD OF MAKING STRUCTURAL BEAMS
Filed Sept. 25, 1939
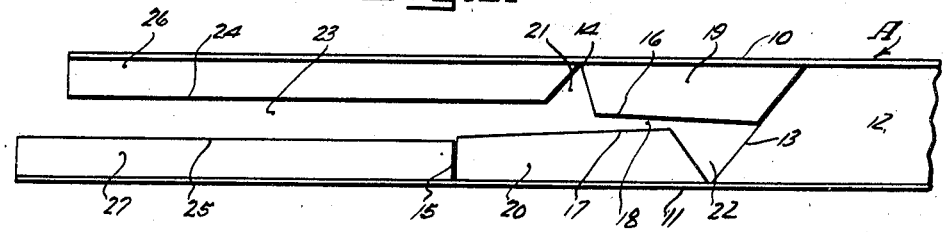
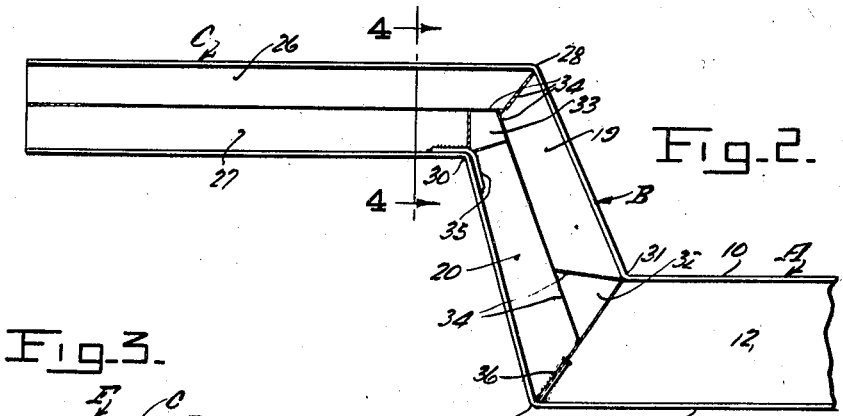
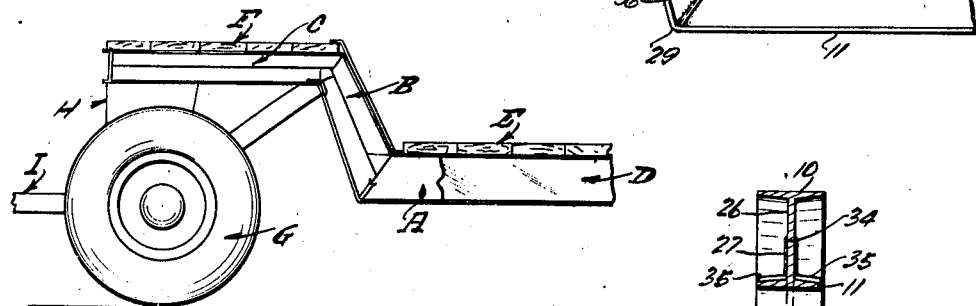
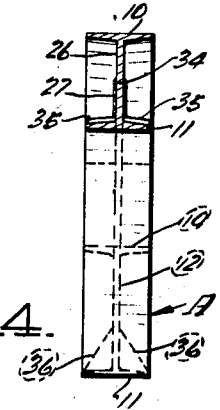
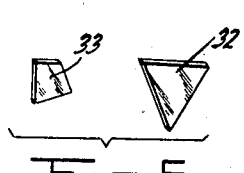
Inventor
Roy C. Townsend
By Carlsen & Hazle
Attorneys Patented Mar. 24, 1942

2,277,615

UNITED STATES PATENT OFFICE 2,277,615

METHOD OF MAKING STRUCTURAL BEAMS

Roy Chester Townsend, La Crosse, Wis.

Application September 25, 1939, Serial No. 296,407

11 Claims. (Cl. 29—155)

This invention relates to structural beams used in the fabrication of structures for carrying heavy loads, such as heavy duty trailers and like vehicles. In the construction of such devices it is desirable from the standpoint of comparative lightness and cheapness to use as the main supporting members a series of rolled section beams of the I-beam and H-beam type rather than to employ castings or other methods of manufacture. However, in the particular type of vehicle here in mind it is necessary to form offset bends at least in the forward ends of certain of the beams used, and, inasmuch as such beams are specifically designed to resist bending stresses, such bending has been extremely difficult.

In view of this desirability of the use of such rolled section beams in trailer structures it is the primary object of this invention to provide an improved method of cutting and forming the beam so that it may be bent to the desired shape without impairing its strength and without requiring the use of excessively heavy bending machinery in the operation.

The method of my invention further provides for the reduction in overall width between flanges of the beam as it is bent. This feature is of particular importance in the fabrication of trailer structures wherein the offset ends of the beams are turned forwardly and upwardly to receive therebeneath the dirigible fore truck or wheels of the trailer. It is imperative of course that there be sufficient head room beneath the offset ends of the beams in order to permit the fore truck or wheels to be angled in the steering operation, but it is also important that the forward, upwardly offset end of the platform be held to as low an elevation as possible in order not to interfere with the load carried upon the trailer. This the present method accomplishes by reducing the (vertical) width of the beam as it is bent upwardly and forwardly so that the platform may be lowered by a corresponding amount.

Other objects and advantages of the invention will be made clear in the course of the following detailed description, taken in connection with the accompanying drawing.

In the drawing—

Fig. 1 is a side elevation of an end portion of a typical structural beam as employed in trailer structures, the web connecting the respective upper and lower flanges being cut and prepared for forming an offset bend in accordance with the invention.

Fig. 2 is a side elevation of the beam with the bend completely formed, the previously cut edges reunited by welding and openings formed by the bending filled by plates welded in place.

Fig. 3 is a side elevation on a reduced scale, of the forward end of a trailer, illustrating the use of beams as bent by the method herein disclosed.

Fig. 4 is a vertical cross section along the line 4—4 in Fig. 2.

Fig. 5 is a composite perspective view of the angular plates which are welded in the openings formed by bending the beam.

Referring now with more particularity to the drawing, the reference character A designates generally an end portion of an I- or H-beam of a well known type having flanges 10 and 11 and a connecting web 12. The beam, however, may be of any other type having spaced flanges connected by a web, as will be understood. In accordance with the present invention the beam A is to be provided with an offset bend B in such manner that a short end C will be extended substantially parallel to the axis of the beam.

To prepare the beam A for bending a cut 13 is first formed in the web 12 diagonally between the flanges 10 and 11 and at a point where the offset bend is to be started. Formed in spaced relation to this cut 13 outwardly toward the end of the beam are additional cuts 14 and 15 which extend to the respective flanges 10 and 11 and are spaced apart at different distances from the cut 13 as shown. The cuts 14 and 15 are joined to the cut 13 by angularly extending cuts along the lines 16 and 17 which are spaced apart and thereby remove a portion 18 from the center of the web. Preferably the resulting centrally freed sections 19 and 20 of the web thus formed taper or diminish in width outwardly or forwardly. Openings or notches 21 and 22 of angular shape are formed at the cut 14 and at the junction of the cuts 17 and 13 to permit the bending operation as will hereinafter appear.

From the cuts 14 and 15 outwardly to the end of the beam a medial strip or portion of the web 12 is removed as at 23 by substantially parallel cuts along the lines 24 and 25, and the uppermost freed section 26 of the beam is cut straight across at its end to a length shorter than the lower section 27 as seen in Fig. 1.

The openings 21 and 22 are formed in accordance with the extent and direction of the bends desired and the various cuts are, of course, spaced in accordance with the amount of offset desired. Likewise the width of the sections of web removed between the cuts 16—17 and 24—25 is selected according to the desired reduction in width of the beam as it is bent.

With the beam thus prepared it is bent in the plane of the web 12 to the offset form shown in Fig. 2, and the contiguous margins of the web sections 19—20 and 26—27 are brought together in this operation thus resulting in a reduction in the width or spacing between the respective flanges 10 and 11 by an amount determined by the width of the various cut web sections. The cuts 13, 14, and 15 permit the flanges 10 and 11 to bend freely at the two opposed bends 28—29 and at the two opposed bends 30—31 and in this process the openings 21 and 22 are closed while the web adjacent the cuts 13 and 15 is spread apart as shown. The openings thus formed in the bending operation are closed by specially and correspondingly shaped patch plates 32 and 33 placed therein.

The various contiguous margins of the cut sections of the web 12 and the plates 32 and 33 are then reunited and connected by welding or brazing along the lines indicated at 34, restoring the web to its original strength. Additional strength is provided by angles 35 welded on the flange 11 over the upper bend 30 at each side of the web 12, and by angular brace plates 36 welded between the flange 11 and each side of the web 12 at the lower bend 29 and over the seam provided as the opening 22 in the web is closed.

As the bending operation takes place the upper section 26 of the beam is pulled back on the lower section 27 so that the ends fall into alignment as clearly shown.

Fig. 3 shows the forward end of a trailer constructed with the use of beams prepared by this invention. Two or more of the beams are employed running from front to rear in transversely spaced relation and with outer spaced side channels D suitably cross connected. A main deck or platform E is laid on the beams and channels and a narrower front or upper deck or platform F is laid on the upper forward ends C of the beams A. The offset forward ends of the beams A thus provide what is known in the art as the "kick-up" or gooseneck below which is mounted the dirigible fore truck or wheels G connected to a fifth wheel mechanism H and steerable by the forwardly extending tongue I.

As heretofore stated, it is imperative that there be enough headroom beneath the offset forward ends C of the beams to provide ample clearance for steering the wheels G, but at the same time it is desirable to reduce as much as possible the overall height of the front deck F laid on these ends in order not to interfere with the load carried on the trailer. This the present invention accomplishes to the greatest practicable extent by reducing the width of the ends C by the amount of the web 12 removed as aforesaid, and correspondingly lowering the platform F. This reduction in width interferes in no way with the effectiveness of the structure since the full strength of the beams is not required at this point as it is through the length of the trailer rearwardly of the front wheels.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. The method of making a reverse bend in a structural beam of the type having a pair of spaced flanges connected by a web, which comprises cutting the web to form openings adjacent the flanges at the points at which the beam is to be bent and removing a medial longitudinally extending section of the web from a point adjacent said openings outward through the end of the beam, bending the beam in the plane of the web at the said openings and forcing the flanges toward each other to draw the retained web parts together along the line at which the longitudinally extending section has been previously removed to thereby reduce the space between the flanges along the bent portion of the beam, and reuniting the cut portions of the web, with one end portion of the beam reduced in size, as between its flanges.

2. The method of making an offset bend in a structural beam of the type having a pair of spaced flanges united by an integral web, which comprises cutting the web adjacent the flanges to form spaced openings, connecting the said cuts by other cuts extending lengthwise to remove an irregular medial section of the web and thereby leave tapering free sections thereof, extending said longitudinal cuts outward through one end of the beam to remove a substantial medial strip therefrom and leave narrow parallel free sections connected to the flanges, bending the flanges adjacent the openings to provide an offset portion connected to the beam by a bent portion, drawing the spaced free sections of the web together marginally to thereby cause a diminution of the spacing between the flanges in the direction of the bend and throughout the length of the offset portion thereof, and repairing the beam by securing the cut margins of the web together.

3. The method of making a bent beam of the type having spaced flanges connected by an integral web, which comprises cutting the web between the flanges at the point where the beam is to be bent and forming an opening adjacent one flange, cutting out a substantial central section of the web to thereby produce marginally spaced sections of the web connected to the respective flanges of the beam, bending the flanges adjacent the cut and drawing the flanges together to bring the previously spaced sections of the web into marginal abutting relation, and repairing the web by welding together the cut sections thereof.

4. The method of making an offset bend in a structural beam of the type having a pair of spaced flanges joined by an integral web, which comprises cutting the web diagonally from one flange to the other at the point where the bend is to be started, extending spaced cuts from the said diagonal cut out through one end of the beam to thereby remove a center portion of the web and produce separated sections thereof connected to the respective flanges, cutting the separated sections out to the flanges at spaced points, bending the beam at the points where said cuts to the flanges are made, drawing the margins of the separated sections of the web together, and reuniting the cut margins of the web by welding.

5. The method of making a bend in a structural beam of the type having a pair of spaced flanges connected by an integral web, which comprises cutting the web between the flanges at the point where the bend is to be made and removing a longitudinal strip of the web from a point adjacent said cut outwardly through one end of the beam, bending the flanges adjacent the cut to the desired shape and drawing the flanges toward each other by a distance substantially equivalent to the width of the strip removed from the web, and reuniting the cut portions of the beam.

6. The method of making an offset bend in a structural beam of the type having a pair of spaced flanges joined by an integral web, which comprises cutting the web diagonally between the flanges and extending spaced cuts longitudinally outwardly through the end of the beam to remove a central portion of the web and divide the web into separate sections spaced apart at their inner margins, notching one section of the web at a point spaced from the diagonal cut, notching the other section of the web at its junction with the diagonal cut and cutting this section out to the flange at a point spaced from the diagonal cut, bending the flanges adjacent the points at which the cuts and notches are made to thereby form opposed bends spreading apart the cuts and opposed bends closing the notches, drawing the separate sections of the web into marginal abutting relation, and welding the contiguous previously cut margins of the web together.

7. The method of making an offset bend in a structural beam of the type having a pair of spaced flanges joined by an integral web, which comprises cutting the web diagonally from flange to flange and extending spaced cuts longitudinally outwardly through the end of the beam to remove a central portion of the web and divide the web into separate sections spaced apart at their inner margins, notching one section of the web at a point spaced from the diagonal cut, notching the other section of the web at its junction with the diagonal cut and cutting this section out to the flange at a point spaced from the diagonal cut, bending the flanges adjacent the points at which the cuts and notches are made to thereby form bends spreading apart the cuts and other bends closing the notches, drawing the separate sections of the web into marginal abutting relation, welding fitted plates into the openings formed as the cuts are spread apart, and welding the contiguous, previously cut margins of the web together.

8. The method of making an offset bend in a structural beam of the type having a pair of spaced flanges joined by an integral web, which comprises cutting the web diagonally between the flanges and extending spaced cuts longitudinally outward through the end of the beam to remove a central section of the web and divide the web into separate sections spaced apart at their inner margins, notching one section of the web at a point spaced from the diagonal cut, notching the other section of the web at its junction with the diagonal cut and cutting this section out to the flange at a point spaced from the diagonal cut, extending the said longitudinal cuts in the web angularly at inner portions to produce outwardly tapering web sections, bending the flanges adjacent the points at which the cuts and notches are made to thereby form bends spreading apart the cuts and other bends closing the notches, drawing the separate sections of the web into marginal abutting relation, and welding the contiguous previously cut margins of the web together.

9. The method of making an offset bent beam from a structural beam of the type having a pair of spaced flanges united by an integral web, which comprises cutting the web crosswise between the flanges and extending other cuts substantially longitudinally outward through the end of the web to separate the same into sections each connected to its respective flange, notching and cutting the web sections outward to the flanges at suitable points and cutting one section shorter than the other, bending the flanges adjacent the cut and notched points in the web and thereby drawing the longer web section along the shorter section and into end alignment therewith, and welding the cut sections of the web to restore the original strength thereof.

10. The method of making an offset bent beam from a structural beam of the type having a pair of spaced flanges united by an integral web, which comprises cutting the web crosswise between the flanges and extending other cuts substantially longitudinally outward through the end of the web to separate the same into sections each connected to its respective flange, notching one web section in spaced relation to the crosswise cut between the flanges, notching the other web section adjacent said crosswise cut and cutting this section out to the flange at a spaced point, bending the flanges to the desired form, repairing the web by welding together contiguous cut margins thereof, and welding brace plates at each side of the web and adjacent flange over at least one of the bends.

11. The method of making a bend in a structural beam of the type having spaced flanges and a connecting web and reducing the space between the flanges of the bent portion of the beam, which includes cutting the web along spaced lines lengthwise to one end of the beam to remove a longitudinal portion of the web and to provide two free web portions united with their respective flanges, bending the flanges adjacent the cut portion of the web to the desired form and drawing bent portions of the flanges toward each other into converging positions to move the said free portions of the web substantially together at their previously spaced inner margins, and reuniting the cut portions of the web by welding.

ROY CHESTER TOWNSEND.